United States Patent
Schneider

(10) Patent No.: US 6,206,155 B1
(45) Date of Patent: Mar. 27, 2001

(54) ENERGY ABSORBING PROTECTIVE SHROUD

(75) Inventor: William C. Schneider, Houston, TX (US)

(73) Assignee: The Unites States of America as represented by the Administrator of the National Aeronautics and Space Administration, Washington, DC (US)

(*) Notice: Subject to any disclaimer, the term of this patent is extended or adjusted under 35 U.S.C. 154(b) by 0 days.

(21) Appl. No.: 09/158,752

(22) Filed: Sep. 22, 1998

(51) Int. Cl.[7] ....................................... F16F 7/12
(52) U.S. Cl. ............................. 188/376; 244/121
(58) Field of Search ....................... 188/371, 373, 188/376, 378, 379; 102/303, 305; 244/121, 129.5

(56) References Cited

U.S. PATENT DOCUMENTS

| | | | |
|---|---|---|---|
| 1,086,707 | * 2/1914 | Hoagland | 102/303 |
| 1,935,339 | * 11/1933 | Tricau | 244/151 R |
| 2,352,036 | * 6/1944 | Tauty | 244/151 R |
| 3,550,957 | * 12/1970 | Radke et al. | 188/371 |
| 3,814,016 | * 6/1974 | Leach et al. | 102/303 |
| 3,937,407 | * 2/1976 | Matsuo | 188/376 |
| 3,997,190 | * 12/1976 | Seiffert et al. | 188/376 |
| 4,490,092 | 12/1984 | Premont | 415/1 |
| 4,588,208 | * 5/1986 | Yoshitsugu | 188/376 |
| 4,744,166 | 5/1988 | Shimokawabe | 415/213 |
| 4,878,821 | 11/1989 | Huther et al. | 415/9 |
| 5,048,863 | * 9/1991 | Henseler et al. | 188/376 |
| 5,071,091 | * 12/1991 | Kahn et al. | 244/121 |
| 5,154,581 | 10/1992 | Borufka et al. | 416/190 |
| 5,234,318 | 8/1993 | Brandon | 416/192 |
| 5,269,656 | 12/1993 | Maga | 416/189 |
| 5,346,362 | 9/1994 | Bonner et al. | 415/191 |
| 5,411,370 | 5/1995 | Varsik | 415/209 |
| 5,423,659 | 6/1995 | Thompson | 415/173 |
| 5,429,477 | 7/1995 | Sikorski et al. | 415/119 |
| 5,482,433 | 1/1996 | Norris | 415/173 |
| 5,718,455 | * 2/1998 | Kawaguchi et al. | 188/376 |
| 5,799,760 | * 9/1998 | Small | 188/371 |

* cited by examiner

Primary Examiner—Robert J. Oberleitner
Assistant Examiner—Thomas J. Williams
(74) Attorney, Agent, or Firm—James M. Cate

(57) ABSTRACT

The present invention is a dissipating protection energy system designed to receive and safely dissipate the kinetic energy from high energy fragments. The energy dissipation system dissipates energy transferred to it by the incremental and progressive rupturing at an approximately constant force of strategically placed sacrificial stitching applied to a number of high strength straps, such as an aromatic polymide fiber of extremely high tensile strength. Thus, the energy dissipation system provides a lightweight device for controlling and dissipating the dangerous and destructive energy stored in high strength fragments released by catastrophic failures of machinery minimizing damage to other critical components.

15 Claims, 4 Drawing Sheets

ENERGY ABSORBING PROTECTIVE SHROUD

ORIGIN OF THE INVENTION

The invention described herein was made by employee(s) of the United States Government and may be manufactured and used by or for the Government of the United States of America for governmental purposes without the payment of any royalties thereon or therefor.

BACKGROUND OF THE INVENTION

1. Field of the Invention

A protective barrier system for controlling potentially destructive kinetic energy, particularly energy possessed by high speed fragments emanating from the failure of high speed machinery.

2. Background of the Related Art

Aircraft engines, turbines and other high speed devices store large amounts of energy in high speed rotary components, such as turbine rotors and gyroscopes. These machines are subject to catastrophic failure due to the high stresses experienced by components rotating at high rotational velocities. Generally, the components most subject to catastrophic failure are made of high strength metals. Accordingly, catastrophic failures generally release high energy fragments of high strength material capable of penetrating most surrounding objects and causing extensive additional damage (i.e. hydraulic lines, electrical lines, etc.) or injury to persons.

Existing apparatus for containing these high energy fragments typically involve the use of shrouds or impenetrable covers as protective barriers. These protective barriers, however, are most often comprised of dense, high strength metal. The use of metal or other dense material in protective barriers adds considerable weight to the machine, a particular disadvantage for turbines, gyroscopes and rotating machines widely used in aviation or space applications. Another disadvantage of using metals or other dense materials in a protective barrier is that they usually result in rigid and comparatively immovable protective barriers that deflect and redirect high energy fragments rather than absorbing or dissipating the destructive energy stored in the fragments. Unless their kinetic energy can be transferred, absorbed or otherwise dissipated, redirected and deflected fragments can reenter the damaged machine or escape the protective barrier altogether, still possessing a significant portion of their original kinetic energy.

There is a need, therefore, for a lightweight protective barrier system which can distribute or transfer the energy of fragments to a device which can dissipate the transferred kinetic energy in a safe and non-destructive manner. It would be desirable if the protective barrier system were thin and lightweight. It would also be desirable if the protective barrier system could, in the process of transferring energy to the energy dissipation device, distribute the energy in a manner to prevent or minimize highly localized stress points in the energy dissipation system.

SUMMARY OF THE INVENTION

The present invention provides a protective barrier that dissipates energy comprising protective barrier slats designed to receive and transfer energy emanating from the catastrophic failure of a machine, high strength straps containing expansion segments which dissipate energy received and transferred from the protective barrier slats, and an low strength, lightweight encapsulating material such as plastic foam used to encase the combined protective barrier slats and high strength straps. The expansion segments formed from the high strength straps may be formed with stitching, adhesives, fasteners, or any other means of attachment.

BRIEF DESCRIPTION OF THE DRAWINGS

So that the above recited features, advantages and objects of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiment

DETAILED DESCRIPTION OF THE PREFERRED EMBODIMENT

Figure 1:
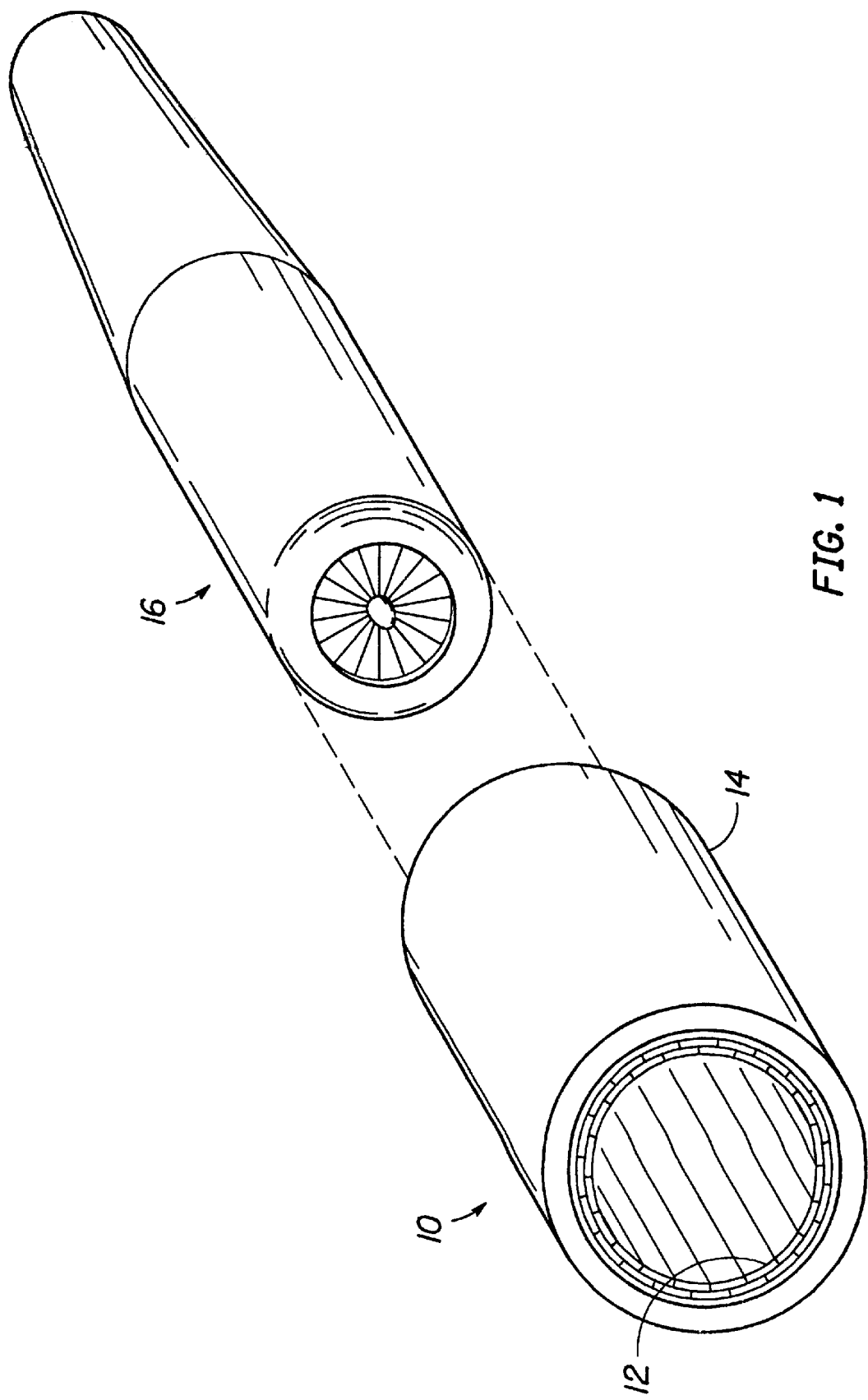
FIG. 1 is an assembly view of a protective barrier system of the present invention prepared for installation in close proximity to an adjacent machine which may potentially emit highe fragments such as aircraft engine turbine components.

The present invention provides an energy dissipating protection system designed to receive and safely dissipate kinetic energy, such as that from high speed objects. The system dissipates energy by rupturing (in a peel mode) of strategically placed sacrificial stitching or fasteners applied to a high strength band, such as an aromatic polymide fiber of extremely high tensile strength (available from DuPont de Numoirs Company, Wilmington, Delaware under the tradename Kevlar). This energy dissipating protection system provides a lightweight device for controlling and dissipating the dangerous and destructive energy stored in high strength fragments released during catastrophic failures of machinery thereby preventing further damage to other critical items.

The energy dissipating system may receive kinetic energy transferred to it from an energy transfer system comprised of one or more protective barrier slats resistant to penetration by high strength, high energy fragments emanating from catastrophic failure of high speed rotating machinery. These protective barrier slats may be solid and made of high strength material such as steel. Preferably, a plurality of thin slats are used in overlapping configuration to maintain a complete barrier to fragments even after some outward displacement.

The protective barrier slats are designed to resist penetration by high speed fragments while transferring the kinetic energy of the fragments to the energy dissipating system. The protective barrier slats are, however, designed to be displaced outwardly against the bands of the energy dissipating load limiting system upon impact of high speed fragments because this design allows the slats to transfer outward forces resulting from the impact of fragments to tension in the bands of the load limiting energy dissipating system. At some threshold below the strength of the band, the tension imparted to the band by the impact of high speed fragments with the protective barrier slats causes rupture in a peel mode of the first portion of the sacrificial stitching in the load limiting expansion segments in the band. As outward expansion of the band occurs due to outward displacement of the protective barrier slats, energy is consumed in rupturing of the sacrificial stitching while limiting the band force to below the tensile strength of the band material. The outward displacement of the protective barrier slats and the bands around the slats requires work due to resistance to outward displacement presented by the load limited failure of the stitching. The amount of work dissipated by the system is approximately equal to the almost constant band force imparted to the protective barrier system times the distances of the displacements resulting from each force. Additional kinetic energy is absorbed or dissipated by the system through friction, galling or deformation of the material surface of the protective barrier slat and possible deformation of the fragments.

The constant force, load limiting energy dissipating system may be constructed of either one or more segments of high strength straps that converge and are stitched together in a coextensive alignment, or one or more loops stitched at spaced intervals in a band of high strength material. The stitched segments or loops are referred to herein as "expansion segments," and are coupled in series with the remaining portion of the high strength band, each expansion segment having a distal end and an attached end. The sacrificial stitching in each expansion segment is made of a material and pattern combination designed to allow the stitching in the expansion segment to progressively rupture by peeling at the approximately constant force thereby allowing the remaining length of the band to increase without exceeding the strength at any point in the band. Sacrificial rupturing of the stitching occurs first at the stitching adjacent to the attached end of the expansion segment. Then, as further energy is transferred to the system, sacrificial rupture progressively occurs at stitches progressively closer to the distal end of the expansion segment.

The energy dissipating system may be of any shape that can surround or substantially enclose a machine or at least form a barrier in a path that may receive fragments. FIG. 1 is a drawing of an energy dissipation system 10 fully prepared for installation in close proximity to an adjacent machine 16 which may potentially emit high energy fragments. The system 10 shown in FIG. 1 is cylindrical in shape for enclosing a typical jet engine. The outside of the system includes an encapsulating material such as low strength plastic foam 14 used to encase the protective barrier slats 12 and the high strength bands (not shown—see FIG. 2) in their positions. Protective barrier members may be of any shape that can be arranged to surround or substantially enclose a machine. The protective barrier slats 12 in FIG. 1 are elongated and arranged to form two concentric rings, one with its interfaces between adjacent slats offset relative to the interfaces in the other ring in order to maintain a complete barrier after radial outward displacement. The encased protective barrier slats and high strength bands with expansion segments are held in fixed positions by the encapsulating material which hardens after application to these components. The encapsulating material serves to hold the working elements in a ready position and to facilitate storage, handling and installation of the invention.

Figure 2:
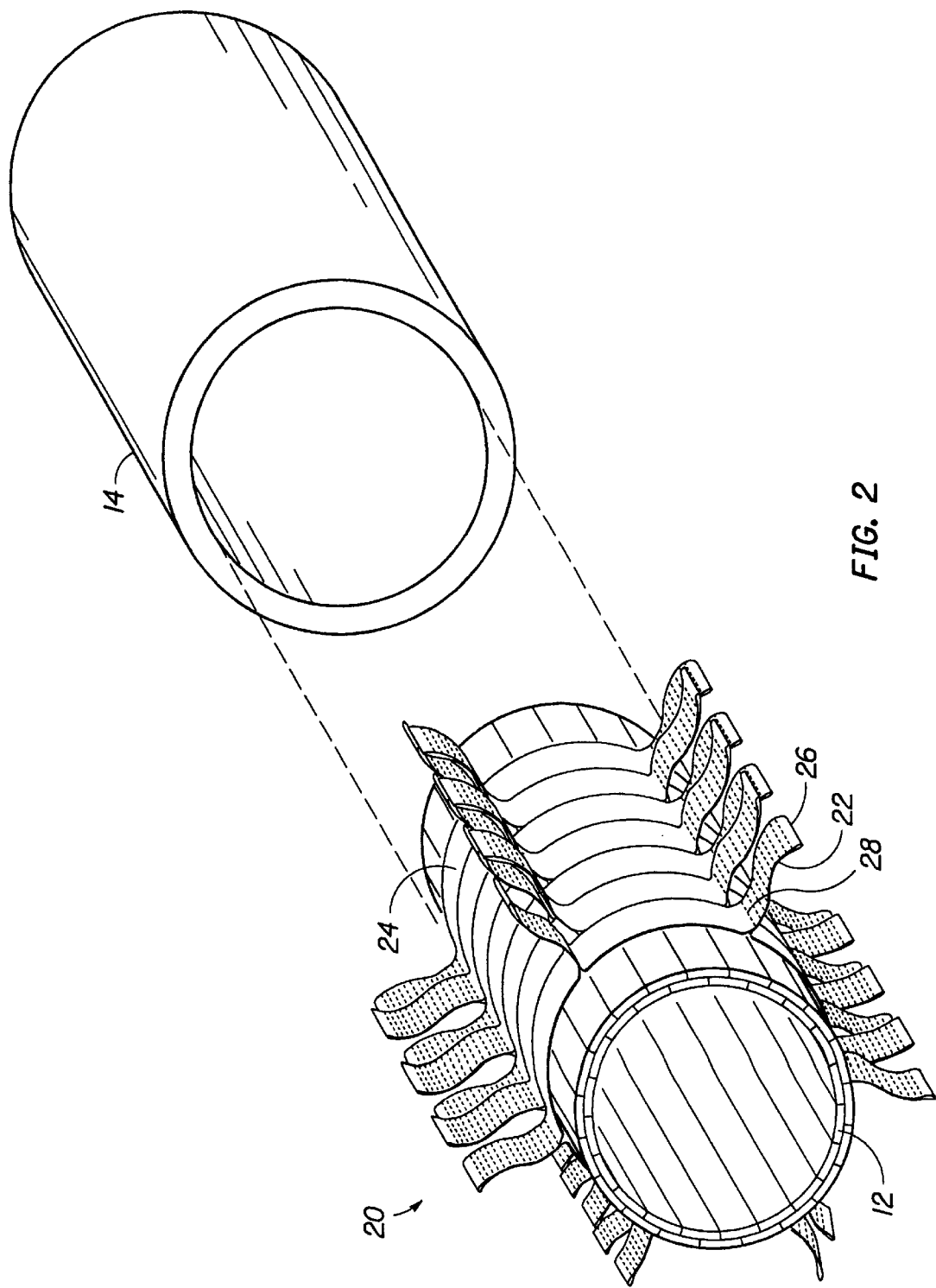
FIG. 2 is an assembly view of the barrier system with a shroud of encapsulating material removed to show a set of seven high strength bands with expansion segments radiating outwardly from the circumference of the unstitched portions of the high strength bands, which are positioned around a number of protective barrier slats.
Figure 3A:
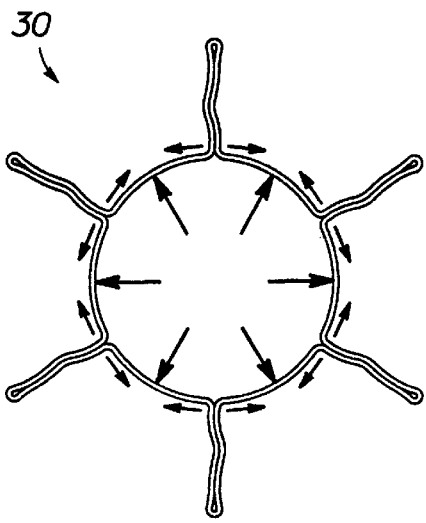
FIGS. 3(A–D) show the sequential condition of a band and expansion segments as it would appear prior to (A), during (B and C) and after (D) the catastrophic failure of a high speed rotating machine.
Figure 3B:
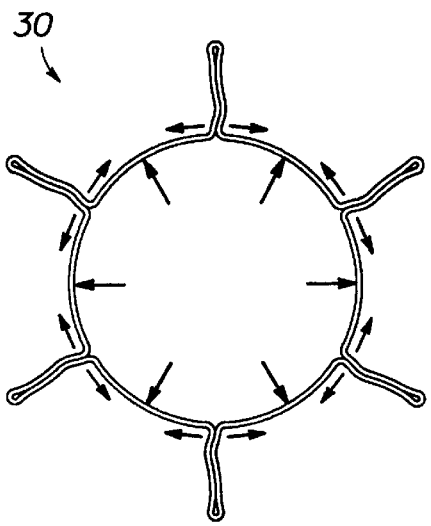
Figure 3C:
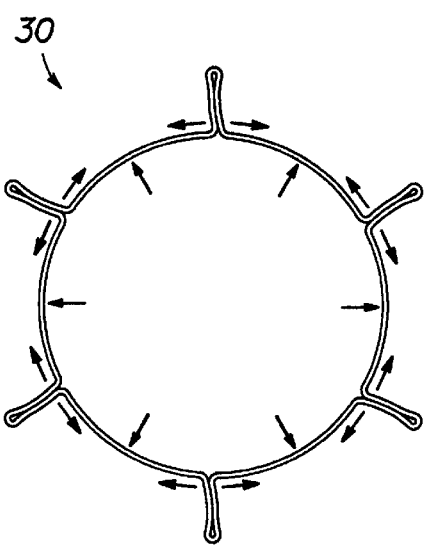
Figure 3D:
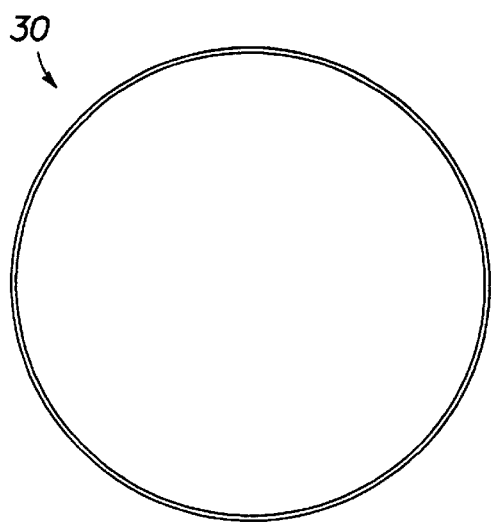

FIG. 2 shows the protective barrier slats and the energy dissipating system 20 as they would appear in position without the encapsulating material 14. The high strength bands 24, each having a number of expansion segments 22, are positioned on and around a number of protective barrier slats arranged in a roughly cylindrical configuration. As shown in FIG. 2, in the illustrated embodiment, each expansion segment 22 extends outwardly from the slats and the intermediate sections of the associated band 24 and each includes an outer or distal end portion 26 and an inner or proximal end portion 28, the latter being adjacent to the outer surfaces of the slats. This configuration might be used as a protective barrier and energy dissipating system for a jet engine, turbine or cargo compartments.

FIGS. 3(A–D) show possible sequential conditions of a typical high strength band 30 and expansion segments 22 as they might appear prior to (FIG. 3A), during (FIGS. 3B and C) and after (FIG. 3D) the failure of a contained machine. These figures show the incremental outward expansion of the band as the stitching forming the expansion segments progressively ruptures under the forces of impact caused by high speed objects emanating from catastrophic failure of a machine and impacting the contained protective barrier slats 12. The materials used in the energy dissipating device include a high strength flexible band, such as Kevlar, and a stitching material applied in a pattern such that the tension in the band causes the stitching to sacrificially rupture at a band tension less than the strength of the band material. It is preferred that the stitching, or other fasteners, form discrete connections between adjacent sections of material so that each stitch fails independent of the other stitches and there is no significant unraveling effect. This system dissipates energy originally impacting the system in the form of kinetic energy in high speed fragments by using the energy to rupture the sacrificial stitching in a controlled manner. The resistance to expansion and displacement of the band imparted by the stitching material consumes the energy imparted to the system as subsequent stitching ruptures under constant force along the expansion segment 22. The expansion of the band does not necessarily occur in such a uniform, circular pattern. In fact, it is more likely that the expansion would occur in a non-circular pattern as a result of the impact of fragments at specific points along the periphery of the band. The band is designed such that this type of non-circular expansion still occurs with uniform tension in the band and progressive rupturing of each expansion segment.

Figure 4:
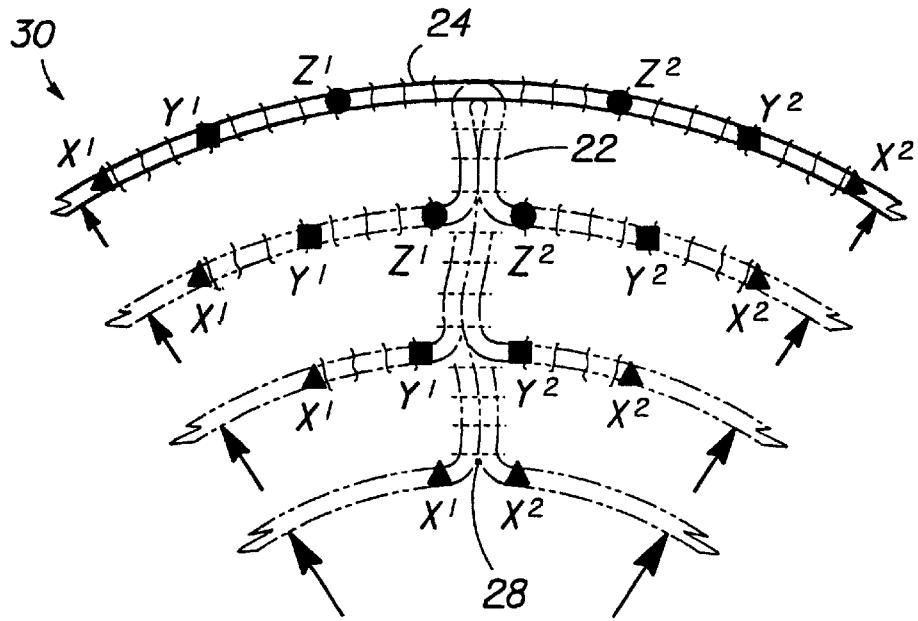
FIG. 4 shows four sequential (from bottom to top) configurations of an expansion segment corresponds to the four sequential conditions in FIG. 3.

FIG. 4 shows four sequential (from bottom to top) configurations of the same band shown in FIG. 3(A–D). FIG. 4 shows how originally contacting point pairs $X_1X_2$, $Y_1Y_2$ and $Z_1Z_2$ located near the attached end, middle and distal end, respectively, of the expansion segment are separated one from the other during outward expansion of the band car expand non symmetrically.

Figure 5:
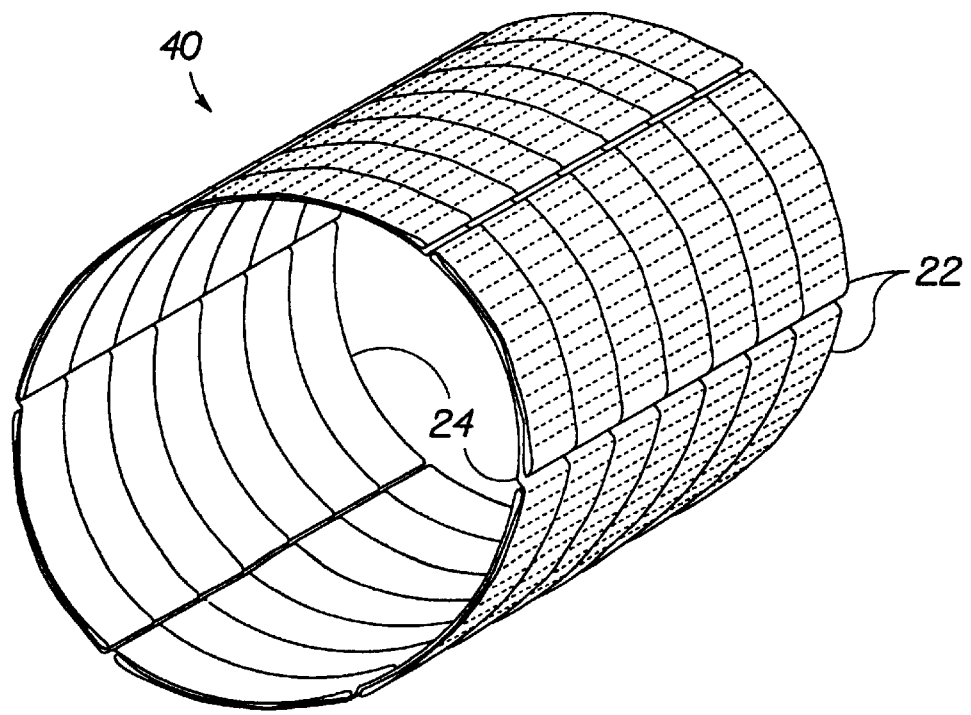
FIG. 5 shows the high strength bands with the expansion segments folded down and laid against the unstitched portions of the high strength straps ready for encapsulation into the low strength foam.

FIG. 5 shows a set of seven high strength bands, each with a number of expansion segments 22 extending outwardly from the high strength band and formed by gathering a portion of the band and stitching it so as to prevent the band from reaching its full length without rupture of the stitches. These expansion segments 22 may be flexible, and can be laid against the remaining portions of the bands 24 that form the circumference of the band as shown in FIG. 5 for compact storage, ease of handling and minimization of space consumed by the system. The high strength bands can be encased or encapsulated using low strength, lightweight plastic foam or a similar lightweight material 14 to hold the assembled system in the desired configuration to facilitate storage, handling and installation of the system.

While the foregoing is directed to the preferred embodiment of the present invention, other and further embodiments of the invention may be devised without departing from the basic scope thereof, and the scope thereof is determined by the claims which follow.

What is claimed is:

1. An energy dissipating shroud, adapted to be mounted adjacent an elongated housing enclosing at least one axially rotatable structure, for capturing fragments of the at least one rotatable structure which may fly radially outwardly from the rotatable structure in the event of a malfunction, the energy dissipating protective shroud comprising:

a plurality of protective elongated members, the elongated members extending longitudinally of and alongside the elongated housing and adjacent to and alongside one another, the elongated members being oriented in an array which conforms to the external configuration of the housing and, in cross-section, extends around the housing, one or more bands of a high tensile strength material, each band extending circumferentially around the array of elongated members and the elongated housing, each band having one or more loops of the high tensile strength material having inside opposing surfaces, wherein the inside opposing surfaces of the one or more loops are joined together with a fastener having a lower strength than the material.

2. The energy dissipating shroud of claim 1, wherein the protective elongated members comprise high strength protective barrier slats having upper and lower surfaces, and wherein the slats are positioned with their respective lower surfaces adjacent the outer peripheral surface of the elongated housing.

3. The energy dissipating shroud of claim 1, wherein the elongated housing is of generally cylindrical configuration, wherein the rotatable structure is mounted coaxially within the elongated housing, and wherein the array of protective elongated members is of generally cylindrical configuration, extending circumferentially around the housing and positioned generally coaxially of the elongated housing and the rotatable structure.

4. The energy dissipating shroud of claim 1, wherein the one or more bands of high tensile strength material comprises a plurality of bands of high tensile strength material each extending circumferentially around the protective elongated members, the bands being mutually spaced along the elongated housing.

5. The energy dissipating shroud of claim 1, wherein the inside opposing surfaces of the loop are joined together using stitches.

6. The energy dissipating shroud of claim 1, wherein the inside opposing surfaces of the loop are joined together using a plurality of discrete stitching segments.

7. The energy dissipating shroud of claim 1, wherein the inside opposing surfaces of the loop are joined together using one or more adhesives.

8. The energy dissipating shroud of claim 1, wherein the inside opposing surfaces of the loop are joined together using one or more fasteners.

9. The energy dissipating shroud of claim 1, further comprising a lightweight, low strength encapsulating material formed about the protective elongated members.

10. The energy dissipating shroud of claim 1, wherein the protective elongated members are arranged to substantially form an enclosure.

11. The energy dissipating shroud of claim 1, wherein the high tensile strength material of which the bands are made is a polymer.

12. The energy dissipating shroud of claim 11, wherein the polymer is an aromatic polymide fiber.

13. The energy dissipating shroud of claim 1, wherein the elongated protective members are metal.

14. An energy dissipating shroud, adapted to be mounted adjacent an elongated, cylindrical housing enclosing at least one axially rotatable structure, for capturing fragments of the at least one rotatable structure which may fly outwardly from the rotatable structure in the event of a malfunction, the energy dissipating protective shroud comprising:

a plurality of protective elongated slats, the elongated slats extending longitudinally of and alongside the elongated housing and adjacent to and alongside one another, the elongated members being oriented in an array which conforms to the external configuration of the housing and, in cross-section, extends circumferentially around the housing, a plurality of bands of a high tensile strength material, each band extending circumferentially around the array of elongated members and the elongated housing, each band having a plurality of loops of the high tensile strength material having inside opposing surfaces, wherein the inside opposing surfaces of the one or more loops are joined together with a fastener having a lower strength than the material.

15. An energy dissipating shroud, adapted to be mounted adjacent an elongated housing enclosing at least one axially rotatable structure, for capturing fragments of the at least one rotatable structure which may fly radially outwardly from the rotatable structure in the event of a malfunction, the energy dissipating protective shroud comprising:

an outwardly expandable, protective shield structure extending longitudinally of and alongside the elongated housing, the shield structure having a configuration which conforms to the external configuration of the housing and, in cross-section, extends around the housing, one or more bands of a high tensile strength material, each band extending circumferentially around the protective shield structure and the elongated housing, each band having one or more loops of the high tensile strength material having inside opposing surfaces, wherein the inside opposing surfaces of the one or more loops are joined together with a fastener having a lower strength than the material, the protective shield structure comprising means for protecting the bands from localized failures caused by impact with outwardly flying fragments.

* * * * *